(12) United States Patent
Lybbert

(10) Patent No.: US 7,876,007 B2
(45) Date of Patent: Jan. 25, 2011

(54) RECTIFIER BRIDGE ASSEMBLY FOR AN AUTOMOTIVE APPLICATION

(76) Inventor: Justin B. Lybbert, 11799 Holbrook Close, Fishers, IN (US) 46037

( * ) Notice: Subject to any disclaimer, the term of this patent is extended or adjusted under 35 U.S.C. 154(b) by 534 days.

(21) Appl. No.: 11/827,881

(22) Filed: Jul. 13, 2007

(65) Prior Publication Data

US 2008/0018186 A1 Jan. 24, 2008

Related U.S. Application Data

(60) Provisional application No. 60/830,992, filed on Jul. 14, 2006.

(51) Int. Cl.
*H02K 11/00* (2006.01)
(52) U.S. Cl. .......................... 310/71; 310/64
(58) Field of Classification Search ............ 310/71, 310/64
See application file for complete search history.

(56) References Cited

U.S. PATENT DOCUMENTS

| | | | | |
|---|---|---|---|---|
| 3,538,362 A * | 11/1970 | Cheetham et al. | ......... | 310/68 D |
| 3,959,676 A * | 5/1976 | Striker | ...................... | 310/68 D |
| 3,982,575 A * | 9/1976 | Ollis et al. | .................. | 411/310 |
| 4,419,597 A * | 12/1983 | Shiga et al. | ............... | 310/68 D |
| 4,540,907 A * | 9/1985 | Hagenlocher et al. | ..... | 310/68 D |
| 4,799,309 A * | 1/1989 | Cinzori et al. | ................ | 29/596 |
| 5,043,614 A * | 8/1991 | Yockey | ...................... | 310/68 D |
| 5,451,823 A * | 9/1995 | Deverall et al. | ........... | 310/68 D |
| 5,453,648 A * | 9/1995 | Bradfield | ..................... | 310/71 |
| 5,866,963 A * | 2/1999 | Weiner et al. | ............. | 310/68 D |
| 5,883,450 A * | 3/1999 | Abadia et al. | ............. | 310/68 D |
| 6,476,527 B2 * | 11/2002 | Ballard et al. | ............. | 310/68 D |
| 6,528,911 B1 * | 3/2003 | De Petris | ..................... | 310/64 |
| 2006/0043805 A1 * | 3/2006 | Bradfield | ................... | 310/68 D |

\* cited by examiner

*Primary Examiner*—Quyen Leung
*Assistant Examiner*—Alex W Mok
(74) *Attorney, Agent, or Firm*—John D. Ritchison

(57) ABSTRACT

This device is an Improved Automotive Rectifier Bridge Assembly device for use in the automotive components remanufacturing and original equipment alternator products. Particularly this device improves the electrical connections, prevents failures related to poor connections and heat variations, and improves and facilitates the assembly and disassembly processes in the remanufacturing of automotive alternators. This device may also be featured as an original equipment rectifier bridge in the automotive applications to improve the quality and durability of the alternator. The preferred embodiment of the device is comprised essentially of an improved "top hat" connection method to the positive heat sink, a fully threaded B+ battery terminal, and a hexagon configured spacer/fastener that has full internal threads to enable easy assembly and secure fastening of the spacer and/or fastener to the B+ stud terminal of the rectifier bridge assembly.

3 Claims, 8 Drawing Sheets

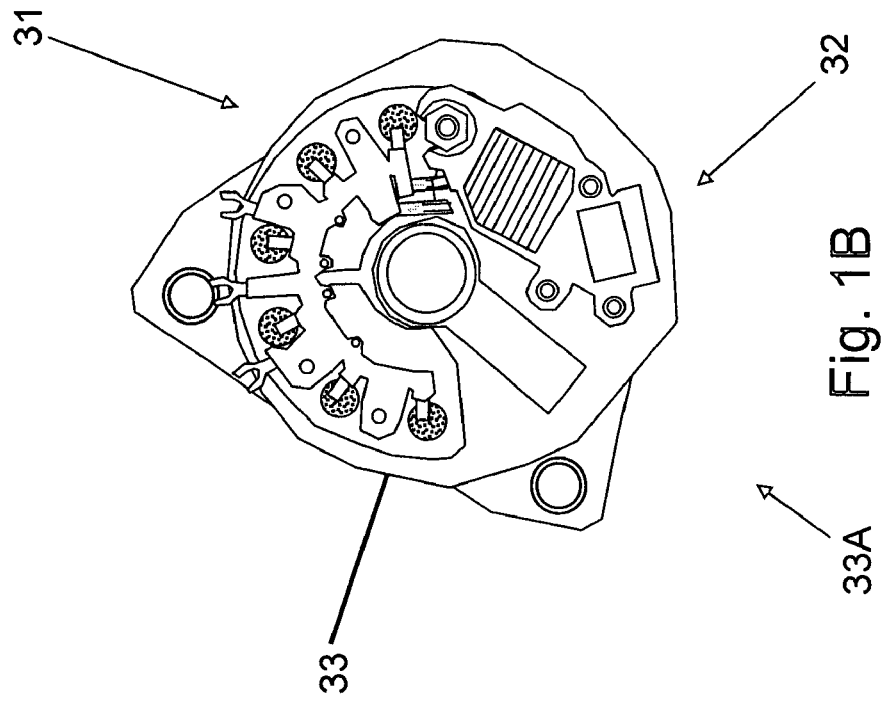
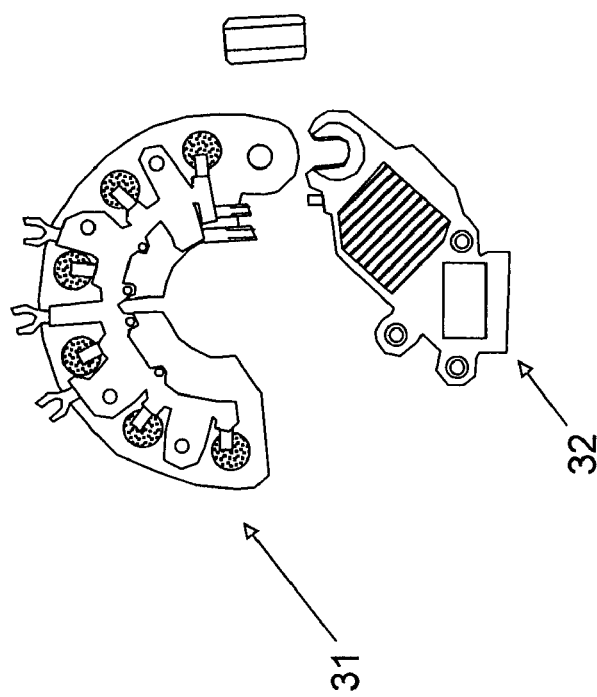
Fig. 1A
Fig. 1B
Fig. 1

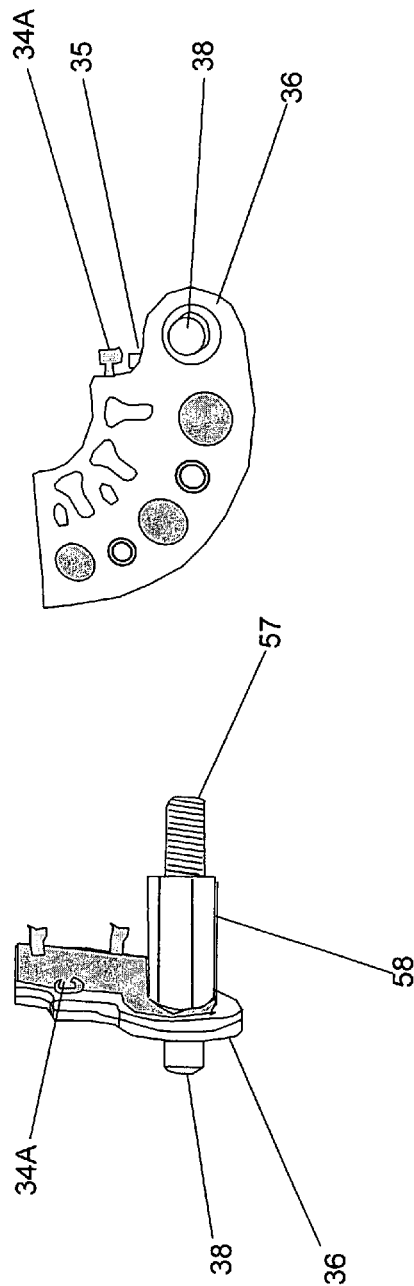
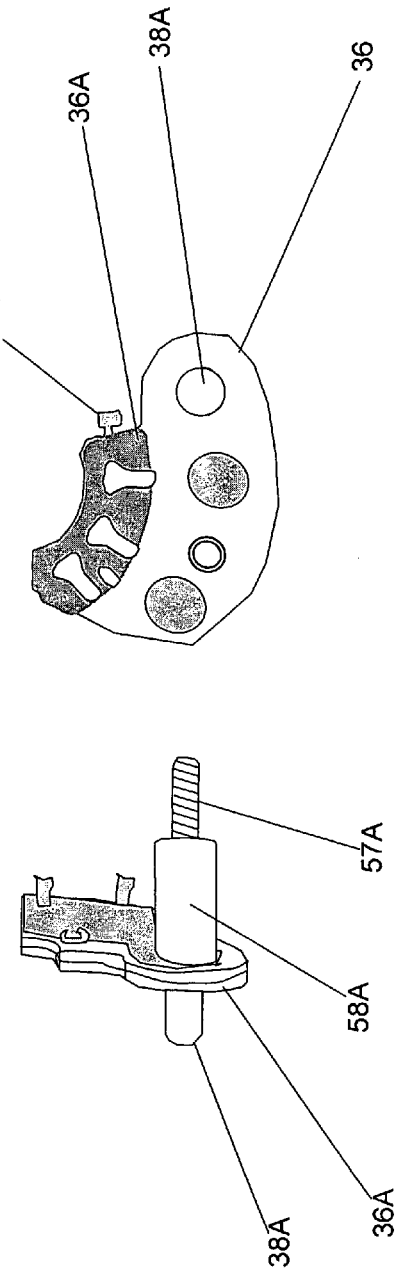
Fig. 4

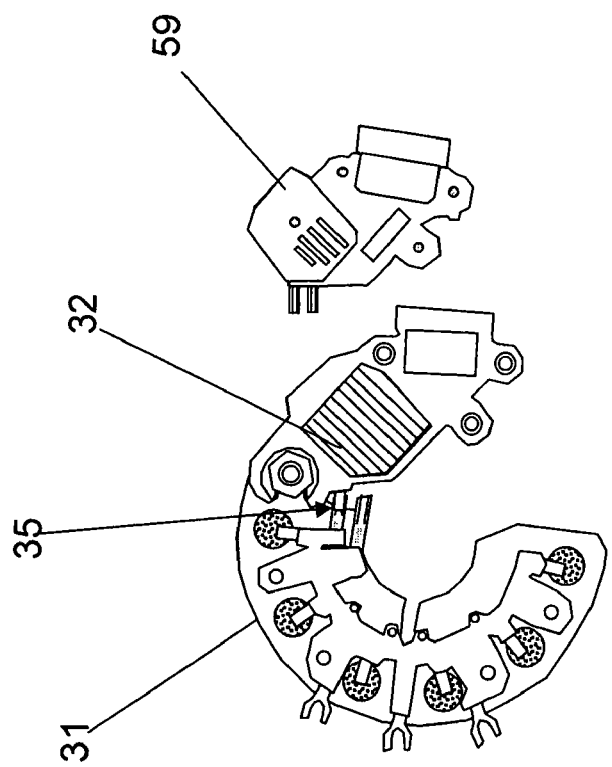
Fig. 6B
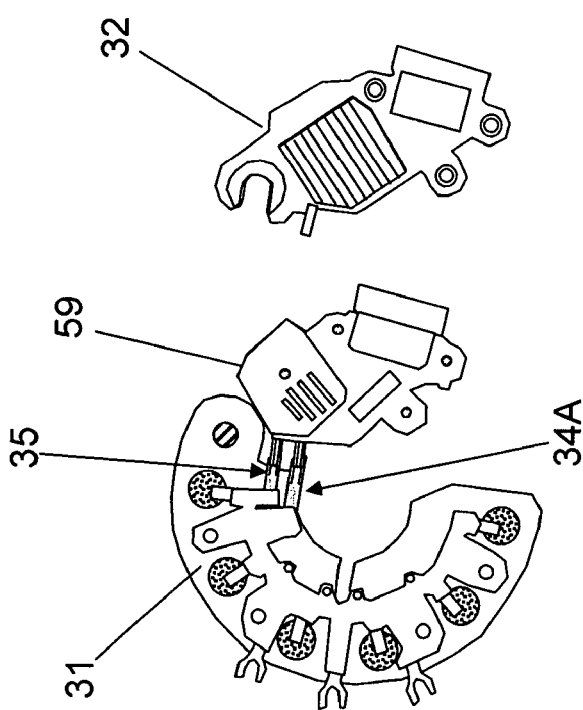
Fig. 6A
Fig. 6

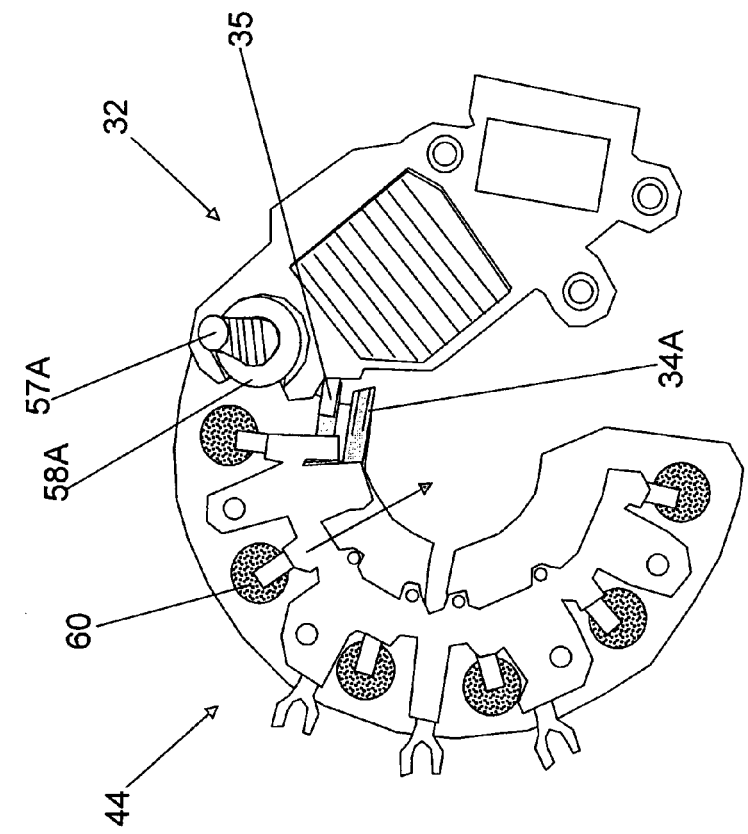
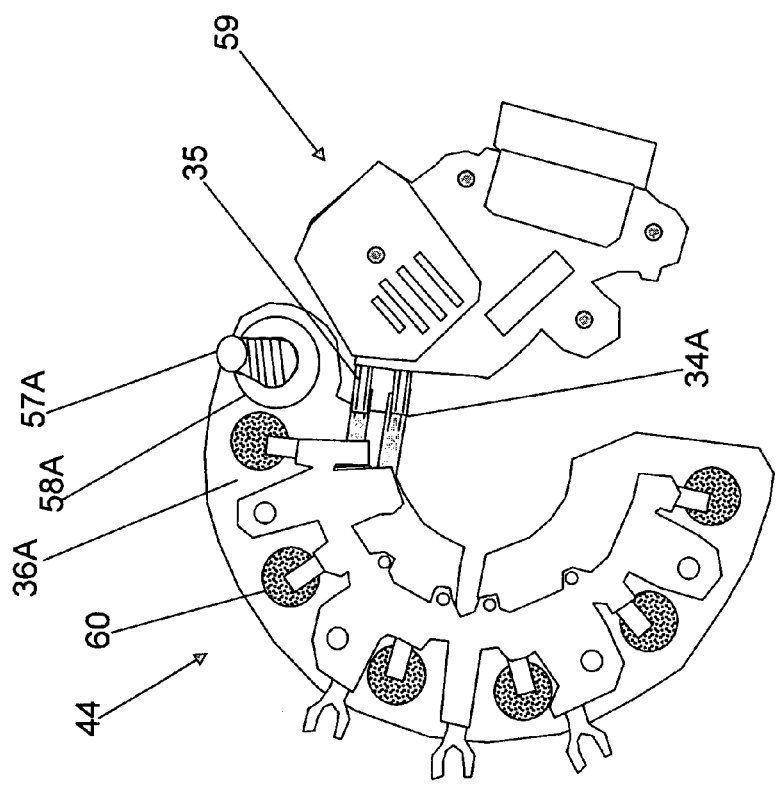
Fig. 7

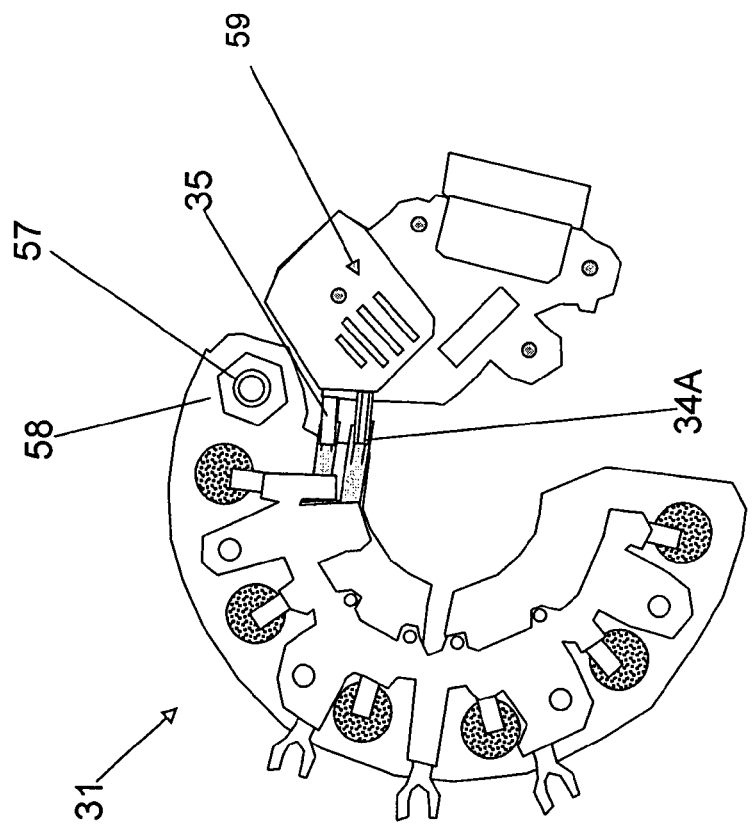
Fig. 8B
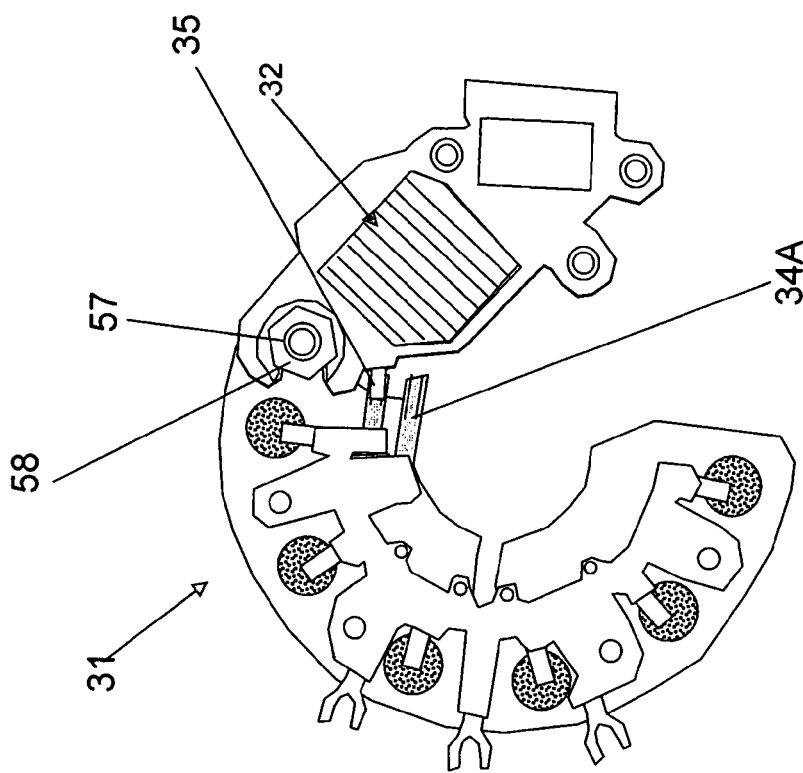
Fig. 8A
Fig. 8

RECTIFIER BRIDGE ASSEMBLY FOR AN AUTOMOTIVE APPLICATION

CROSS-REFERENCE TO RELATED APPLICATIONS

This application claims the benefit of Provisional Patent Application Ser. No. 60/830,992 filed Jul. 14, 2006 by Justin Lybbert, and titled "Improved Rectifier Bridge Assembly for an Automotive Application".

FIELD OF INVENTION

This invention relates to a special Improved Automotive Rectifier Bridge Assembly device for use in the automotive components re-manufacturing and original equipment alternator product. Particularly this new Improved Automotive Rectifier Bridge Assembly device is related to devices and methods to improve the electrical connections, to prevent failures related to poor connections and heat variations, and to improve and facilitate assembly and disassembly processes in the remanufacturing of automotive alternators. This Improved Automotive Rectifier Bridge Assembly device may be featured as an improved replacement rectifier bridge in the automotive electrical components re-manufacturing industry. It may also be featured with the original equipment as a manner to improve the quality and durability of the alternator rectifier bridge Assembly device.

FEDERALLY SPONSORED RESEARCH

None.

SEQUENCE LISTING OR PROGRAM

None.

BACKGROUND

Field of Invention and Prior Art

The new Improved Automotive Rectifier Bridge Assembly is basically a product that is designed to provide improvements to the mechanical configuration of the rectifier bridge assembly to permit easy, fast and secure replacement. Other features offer more robust connections (including higher torque capability0, reduced corrosion paths, and interchangeability for replacement and original equipment applications.

A. INTRODUCTION OF THE PROBLEMS ADDRESSED

The charging system in vehicles has always faced tough environmental and system conditions. Harsh corrosion from road water, salt, and mud; high vibration from rough roadways; and, high temperatures from under hood insulation increased electrical loads requiring higher outputs by the alternator, thus increasing the ambient temperatures the unit, including the rectifier bridge, is exposed to in operation. Further, in the automotive parts remanufacturing processes, dis-assembly and refurbishing has been difficult. Often wires needed "un-soldered" or cut free and then re-soldered. Fasteners and Battery terminals are subjected to over-torque conditions. Placement of plastic or composite materials in "stack-ups" subject fastening means to "creep" or other sub-optimal conditions. Fasteners often are not reconnected and torqued and tightened properly. And, less than optimum materials for replacement have been used. All these environmental and processing concerns affected the quality and durability of the rectifier bridges and ultimately may result in shorter life and early failures to remanufactured alternators.

B. PRIOR ART

In recent years, some rectifier bridges, particularly with original equipment designs have attempted to address these problems and shortfalls. However, to date, none have provided the improvements offered by the Lybbert Improved Automotive Rectifier Bridge Assembly as to simplicity and robustness.

As far as known, there are no other Automotive Rectifier Bridge Assembly devices at the present time which fully provide these improvements to the Automotive Rectifier Bridge Assembly as the present Improved Automotive Rectifier Bridge Assembly device. It is believed that this device is made with improved configuration of physical connections, of a durable design, and with better electrical connections and integrity as compared to other currently utilized rectifier bridge assemblies.

SUMMARY OF THE INVENTION

An Improved Automotive Rectifier Bridge Assembly device has been developed for use with an automotive alternator in the automotive electrical component re-manufacturing industry. The device may also be used for an improved original equipment (OE) rectifier bridge. It is important to note that many variations and models of automotive alternators may use this device with minor physical changes for mounting.

In the vehicle during operation the alternator is exposed to severe vibration, heat and corrosive materials such as road salt. Also, in the re-manufacturing operation, the rectifier bridge may be exposed to difficult disassembly and reassembly processing by inexperienced or untrained assembly operators. Likewise during the rebuild process, a robust connection design (for proper electrical connections) will help to afford and assure a high quality and durable replacement alternator. Specifically, the Improved Automotive Rectifier Bridge Assembly device provides an economical, efficient and durable way to improve the performance and durability of a Rectifier Bridge assembly and alternator product.

The preferred embodiment of the Improved Automotive Rectifier Bridge Assembly device is comprised essentially of An improved "top hat" connection method to the positive heat sink, a fully threaded B+ battery terminal, and a hexagon configured spacer/fastener that has full internal threads to enable easy assembly and secure fastening of the spacer/fastener to the B+ stud terminal of the rectifier bridge assembly.

The newly invented Improved Automotive Rectifier Bridge Assembly device is configured to aid in fast, efficient and high quality re-build in the re-assembly process. In operation, the new device may be easily and quickly affixed to the voltage regulator and mounted to the slip ring end casting with simple tools.

OBJECTS AND ADVANTAGES

There are several objects and advantages of the Improved Automotive Rectifier Bridge Assembly device. There are currently no known Automotive Rectifier Bridge Assemblies that are effective at providing the objects of this invention.

The following TABLE A summarizes various advantages and objects of the Improved Automotive Rectifier Bridge Assembly device. This list is exemplary and not limiting to the many advantages offered by this new device.

TABLE A

Various Advantages and Objects

| Item | Description of Advantage and Object |
|---|---|
| 1 | Disassembly and reassembly of the rectifier bridge is simplified. One does not have to be concerned with the spacer and the B+ connection. The hex fastener permits a secure pressure fit of the regulator to the bridge assembly. |
| 2 | When used with the Taditel improved regulator, there is an elimination of the Bridge corrosion problem associated with the OE design that affects the regulator operation. |
| 3 | The rectifier is manufactured with OE materials. |
| 4 | The rectifier is designed to fit 6 and 8 MM studs. |
| 5 | The "top hat" connector from the B = terminal to the positive heat sink has anti-turn features and a more robust/larger footprint design to afford increased torque resistance when the B+ nut is assembled to the B+ stud during the assembly in the vehicle with the power harness connection to the (eventually) starter |

Finally, other advantages and additional features of the present Improved Automotive Rectifier Bridge Assembly device will be more apparent from the accompanying drawings and from the full description of the device. For one skilled in the art of devices and improvements for electrical rectification from alternate to direct current bridges, it is readily understood that the features shown in the examples with this mechanism are readily adapted for improvement to other types of rectifier bridge devices and systems.

DESCRIPTION OF THE DRAWINGS

Figures

The accompanying drawings, which are incorporated in and constitute a part of this specification, illustrate a preferred embodiment for the Improved Automotive Rectifier Bridge Assembly device. The drawings together with the summary description given above and a detailed description given below serve to explain the principles of the Special Improved Automotive Rectifier Bridge Assembly device. It is understood, however, that the device is not limited to only the precise arrangements and instrumentalities shown.

FIGS. 1 A and B depict the general Improved Automotive Rectifier Bridge Assembly device for remanufacturing and original equipment applications and assembly thereof.

FIGS. 4 A through 4 D are sketches of components that show Views of the new Top Hat battery post and former/current original equipment (OE) post. For a new or a standard OE rectifier bridge.

FIGS. 6 A and 6 B are sketches that show Top Views of the OE and Improved regulators connected to the Improved Automotive Rectifier Bridge Assembly device.

FIGS. 7 A and 7 B are sketches that show the standard OE rectifier bridge assembled to the original OE and new improved replacement voltage regulators.

FIGS. 8 A and 8 B are sketches that show the new and improved rectifier bridge assembled to the original OE and new improved replacement voltage regulators.

DESCRIPTION OF THE DRAWINGS

Reference Numerals

Figure 2:
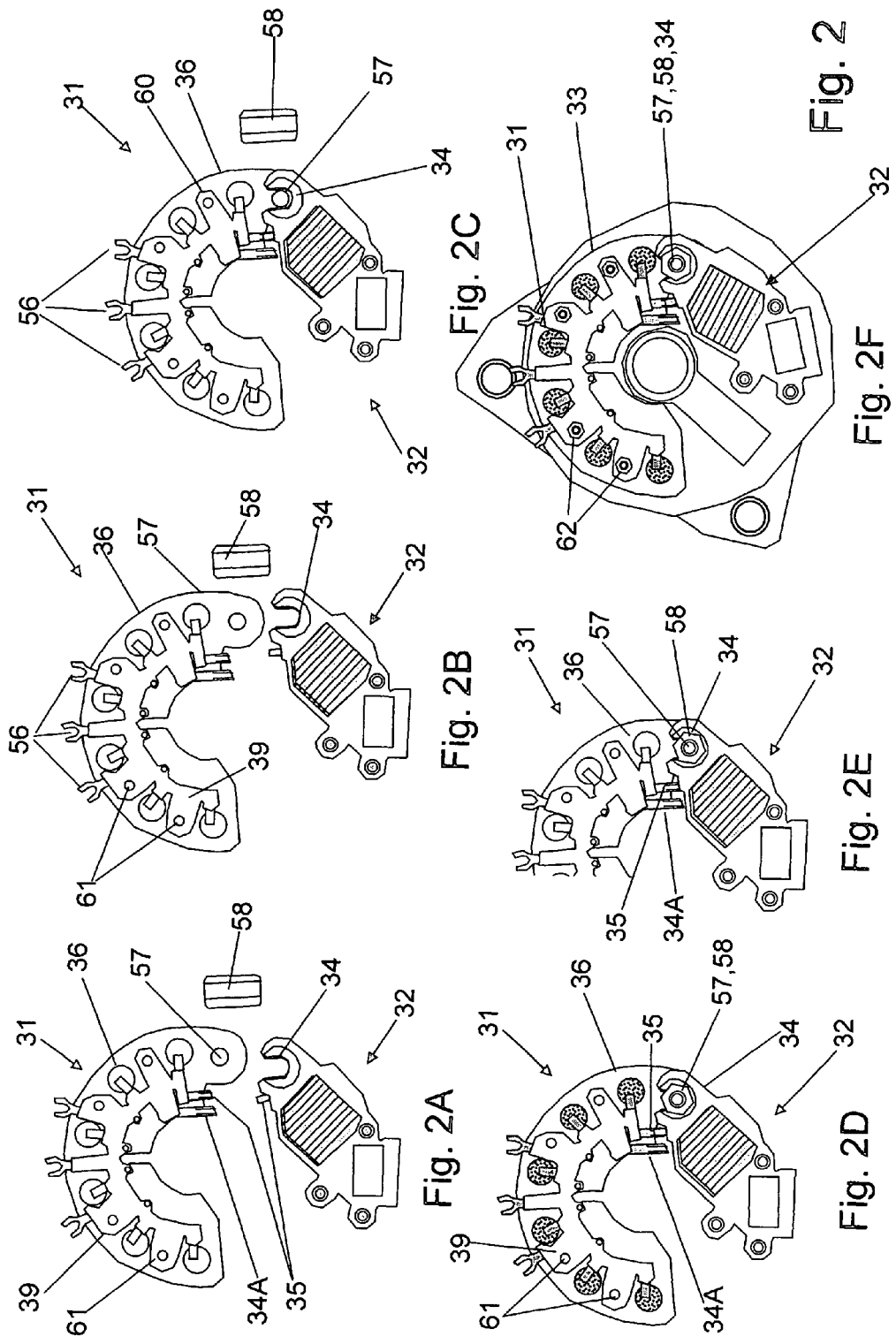
FIGS. 2 A through 2 F show Top View sketches of the Improved Automotive Rectifier Bridge Assembly device in a progressive sequence of connecting the replacement rectifier bridge to a new type of voltage regulators.

The following list refers to the drawings:

| Ref # | Description |
|---|---|
| 31 | General Improved Automotive Rectifier Bridge Device |
| 32 | General Improved Automotive Silicon based Voltage Regulator (I-ASVR) |
| 33 | Slip Ring End (SRE) casting |
| 33A | SRE casting, Rectifier Bridge and Regulator Assembly |
| 34 | B+ semi ring terminal |
| 34A | Original Equipment (OE) B+ terminal |
| 35 | P or Phase tracking terminal |
| 36 | Positive and negative heat sinks |
| 36A | Coated Positive heat sink |
| 37 | Ground system |
| 38 | Bottom New top hat device for new rectifier |
| 38A | Bottom top hat device for current OE rectifier |
| 39 | Insert molded electrical connection means among and between diodes and stator lead 56 |
| 41 | Electrical diagram or schematic |
| 44 | Original Equipment (OE) rectifier bridge |
| 56 | Stator lead terminal |
| 57 | B+ stud/fastener on improved regulator 31 |
| 57A | B+ stud/fastener on Original equipment (OE) |
| 58 | B+ fastener on improved regulator 31 |
| 58A | B+ spacer on original equipment regulator 59 |
| 59 | Original Equipment Voltage regulator |
| 60 | B+ corrosion path on existing rectifier bridges |
| 61 | Aperture in heat sink for means to connect |
| 62 | Means to connect heat sinks to SRE casting |

DETAILED DESCRIPTION OF PREFERRED EMBODIMENT

The present mechanism is an Improved Automotive Rectifier Bridge Assembly device 31 that has been developed for use in the aftermarket for rebuilding automotive alternators. The preferred embodiment of the Improved Automotive Rectifier Bridge Assembly device 31 is comprised essentially of an improved "top hat" connection method 38 to the positive heat sink 36, a fully threaded B+ battery terminal 57, and a hexagon configured spacer/fastener 58 that has full internal threads to enable easy assembly and secure fastening of the spacer/fastener to the B+ stud terminal of the rectifier bridge assembly.

There is shown in FIGS. 1-8 a complete operative embodiment of the Improved Automotive Rectifier Bridge Assembly device 31. In the drawings and illustrations, one notes well that the FIGS. 1-8 demonstrate the general configuration and use of this invention. The preferred embodiment of the improved device 31 is comprised of changes in B+ terminal 57 and connection to the Positive heat sink 36.

The preferred embodiment of the Improved Automotive Rectifier Bridge Assembly device 31 is comprised essentially of an improved "top hat" connection method 38 to the positive heat sink 36, a fully threaded B+ battery terminal 57, and a hexagon configured spacer/fastener 58 that has full internal threads to enable easy assembly and secure fastening of the spacer/fastener 58 to the B+ stud terminal 57 of the rectifier bridge assembly 31.

The accompanying drawings, which are incorporated in and constitute a part of this specification, illustrate an embodiment of the Improved Automotive Rectifier Bridge Assembly device 31 that is preferred. The drawings together with the summary description given above and a detailed description given below serve to explain the principles of the Improved Automotive Rectifier Bridge Assembly device 31. It is understood, however, that the Improved Automotive Rectifier Bridge Assembly device 31 is not limited to only the precise arrangements and instrumentalities shown.

FIGS. 1 A and B depict the general Improved Automotive Rectifier Bridge Assembly device for remanufacturing and original equipment applications and assembly thereof. The Improved Automotive Rectifier Bridge Assembly device 31 is shown coupled to a voltage regulator 32. Then the device 31 is shown mounted to the Slip Ring End (SRE) Casting 33. In this assembly configuration, the device 31 is part of the SRE assembly 33A comprised of the Improved Automotive Rectifier Bridge Assembly device 31, a regulator 32, a casting 33, and a brush holder.

FIGS. 2 A through 2 F show Top View sketches of the Improved Automotive Rectifier Bridge Assembly device 31 in a progressive sequence of connecting the replacement rectifier bridge 31 to a new type of voltage regulators 32. FIGS. 2 A through 2C show the Improved Automotive Rectifier Bridge Assembly device 31 positioned and moving toward the voltage regulators 32. The apertures 61 for mounting the device 31 to the SRE casting 33 is shown as well as the insert molded plastic and metal interconnect 39. One skilled in the art of electronic and electrical devices well appreciates the plethora of options for the physical configuration of the interconnections and the mounting. Nearly as boundless are the plastic and electrically conductive metals and materials to create the means to interconnect 39 with mounting apertures 61. The P terminal 35 is shown mated into the Improved Automotive Rectifier Bridge Assembly device 31 and is ready to connect (by soldering or other means) to the voltage regulators 32. The Open "C" or ring terminal of the B+ 34 encircles and is placed contiguous to the B+ stud 57. The threaded adapter nut and spacer 58 is ready to assemble onto the threaded stud 57 of the Improved Automotive Rectifier Bridge Assembly device 31. FIGS. 2 D and 2 E show the fastener 58 being placed onto the bridge stud 57. In FIG. 2 F the Improved Automotive Rectifier Bridge Assembly device 31 and voltage regulators 32 are shown assembled to the SRE casting 33. The materials and configurations of the B+ space and fastener 58 and the B+ stud 57 are described in further detail below in FIG. 4. In FIG. 2 F, the whole device 31 is mounted on the SRE casting 33 by a fastening means 62 such as externally threaded fasteners or the like. Finally, an interesting point is demonstrated where a redundant B+ terminal 34A from the Improved Automotive Rectifier Bridge Assembly device 31 is shown in all views. This terminal permits an older style Original Equipment regulator to fit the Improved Automotive Rectifier Bridge Assembly device 31. This is shown in other drawings below.

Figure 3:
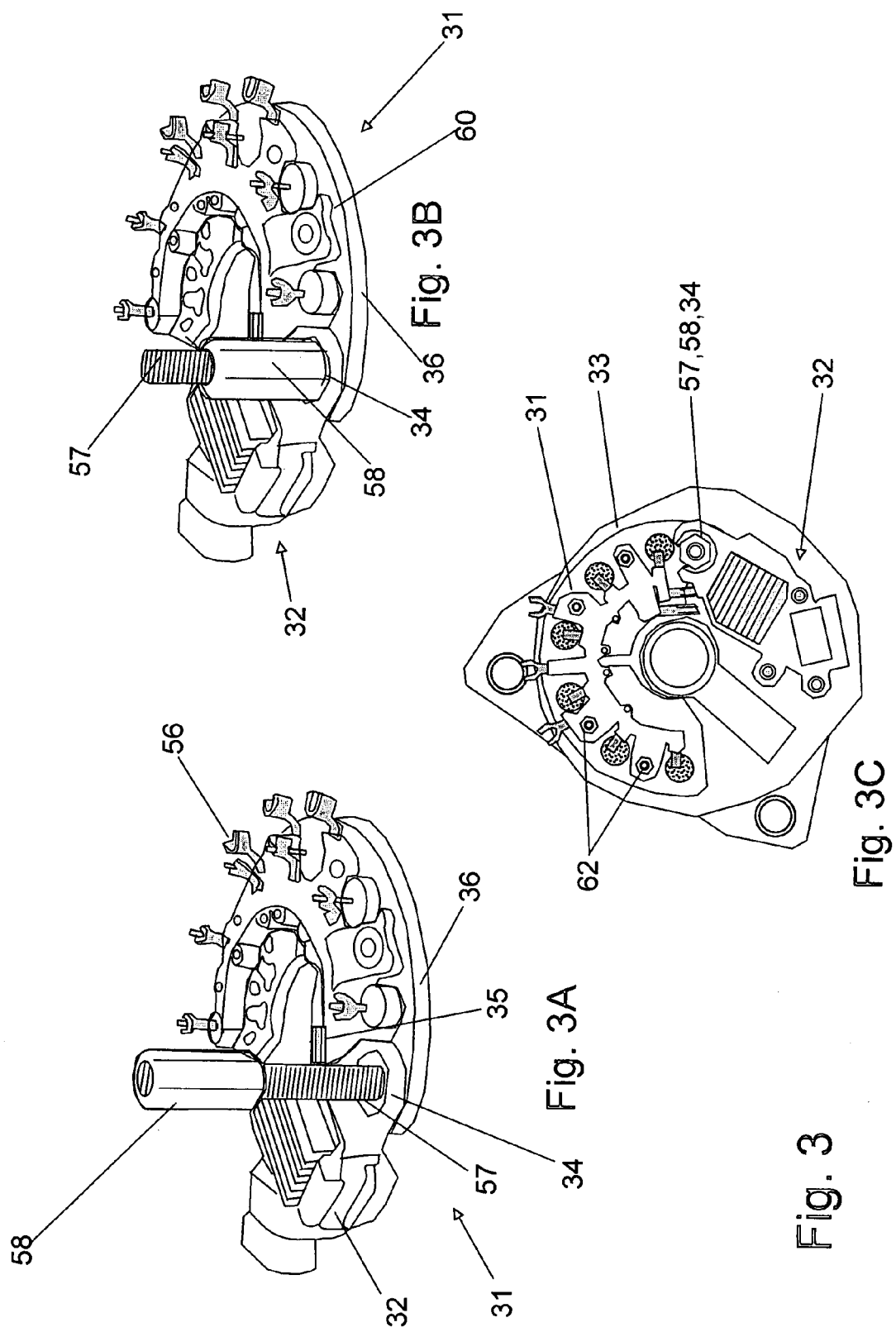
FIGS. 3 A through 3 C are Side View sketches of components of the Improved Automotive Rectifier Bridge Assembly device in a progressive sequence of connecting to a new type I-ASVR voltage regulator.

FIGS. 3 A through 3 C are Side View sketches of components of the Improved Automotive Rectifier Bridge Assembly device 31 in a progressive sequence of connecting to a voltage regulators 32. These views have the same components described in the various figures, above, and in FIG. 4, below. The material characteristics of the components are generally a conductive metal that may be threaded and machined. Often, the surface has a coating that supports a good conduction of electricity and yet retards or prevents corrosion. In FIG. 3B, one is well to note the very secure yet removable connection afforded by the threaded stud 57 and internally threaded spacer/fastener 58. This combination traps and sandwiched the Open "C" B+ ring terminal 34 between the fastener 58 and the positive heat sink 36. FIG. 3B repeats the mounting of the device 31, the regulator 32 onto the casting 33 by a fastener means 62.

FIGS. 4 A through 4 D are sketches of components that show Views of the new Top Hat battery post 38 and shows both the former original equipment (OE) battery post 57. When FIG. 4 A (side view of the Improved Automotive Rectifier Bridge Assembly device 31) and FIG. 4 C (side view of the Original Equipment rectifier bridge) are contrasted, the differences are apparent. With the Improved Automotive Rectifier Bridge Assembly device 31, a very secure connection between the externally threaded stud 57 and internally threaded stud/fastener 58 is achieved by way of the threaded connection. The B+ terminal 34 (not shown) is sandwiched between the heat sink 36 and the fastener 58. In the FIG. 4 C the spacer 58A is without internal threads and is "pushed onto" the stud 57A. The stack-up of the secured connection passes through the un-threaded spacer 58A and is dependent on some interference fit and the battery nut to make a secure connections. Also, the positive heat sink 57A has a coating which must be scraped away for a good electrical connection. One notes that the Improved Automotive Rectifier Bridge Assembly device 31 may use any size stud 57 such as, for example and not limitation, a 6 MM or 8 MM stud 57.

When FIG. 4 B (bottom view of the Improved Automotive Rectifier Bridge Assembly device 31) and FIG. 4 D (bottom view of the Original Equipment rectifier bridge) are contrasted, the differences are still very apparent. The Improved Automotive Rectifier Bridge Assembly device 31 shown in FIG. 4 B demonstrates a top hat connector method 38 with a larger diameter to provide increased torque capability as compared to the Original Equipment device 38A shown in FIG. 4 D with limited capability to resist torques. One skilled in the art of fasteners and torque resistance realizes well that the standard straight-through stud 38A with the OE device has more limited resistance. In a remanufacturing operation or a vehicle repair shop or garage, the alternator is often exposed to uncontrolled over-torque condition of the battery nut which may permit a "twist out" between the stud 57 and heat sink 36. Once this stripping occurs, the connection is damaged. However, this limitation may only become apparent when high heat or vibration allows the connection to fail and cause an alternator failure to occur. Therefore, the quality defect is more of a concern since the defect may not be found by testing at the rebuilder's manufacturing location, only with the end vehicle user. One notes also in FIG. 4B the redundant B+ terminal 34A for fitting to the old style regulators 59 as well as the improved regulators 32 regulators not shown—see FIGS. 6 through 8.

Figure 5:
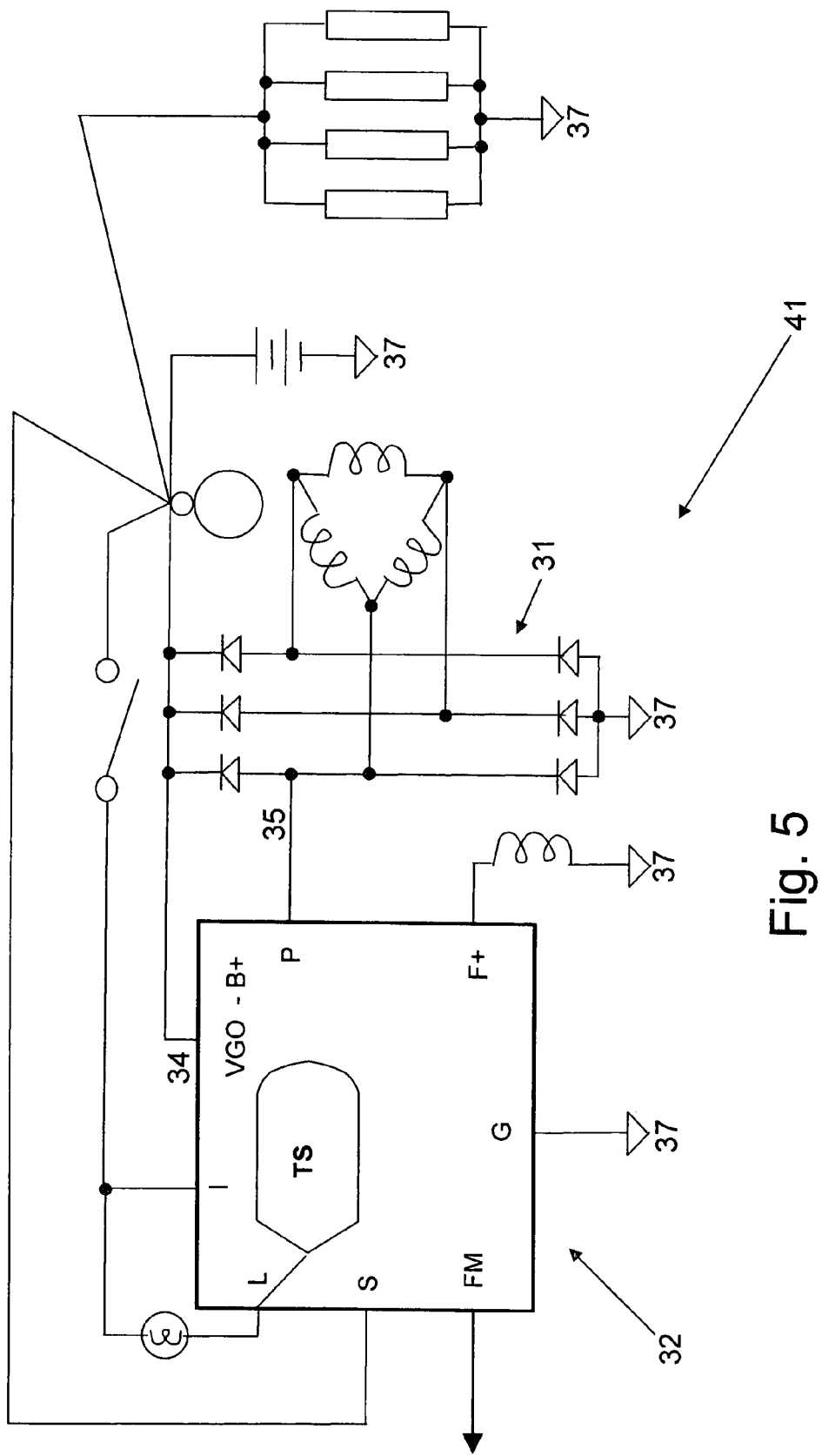
FIG. 5 is the detailed electrical schematics for the Improved Automotive Rectifier Bridge Assembly device and a Voltage Regulator.

FIG. 5 is the detailed electrical schematics for the Improved Automotive Rectifier Bridge Assembly device 31 and a Voltage Regulator. It is discussed below in the operation section.

FIGS. 6 A and 6 B are sketches that show Top Views of the OE and Improved regulators 32 and 59 connected to the Improved Automotive Rectifier Bridge Assembly device 31. In FIG. 6 A, an original equipment regulator 59 is shown connected to the Taditel Improved Automotive Rectifier Bridge Assembly device 31. An improved replacement Taditel regulator 32 is placed alongside for perspective and reference. In FIG. 6B, an improved replacement Taditel regulator 32 is shown connected to the Taditel Improved Automotive Rectifier Bridge Assembly device 31. An original equipment regulator 59 is placed alongside for perspective and reference. This shows that the Improved Automotive Rectifier Bridge Assembly device 31 is fully compatible in remanufacturing to use the device 31 with either the original regulator 59 or with the improved replacement regulator 32. The device 31 has both the phase terminal 35 and the redundant B+ terminal 34A which permits the versatility to connect with either of the regulators 32 and 59.

FIGS. 7 and 8 are sketches that show how the rectifier bridge 31 is used. This operation is described below.

All of the details mentioned here are exemplary and not limiting. Other specific components specific to describing an Improved Automotive Rectifier Bridge Assembly device 31 may be added as a person having ordinary skill in the field of electrical rectification for alternators devices well appreciates.

OPERATION OF THE PREFERRED EMBODIMENT

The new Improved Automotive Rectifier Bridge Assembly device 31 has been described in the above embodiment. The manner of how the device operates is described below. One skilled in the art and field of electrical rectification for alternators devices will note that the description above and the operation described here must be taken together to fully illustrate the concept of the Improved Automotive Rectifier Bridge Assembly device 31.

The preferred embodiment of the Improved Automotive Rectifier Bridge Assembly device 31 is comprised essentially of an improved "top hat" connection method 38 to the positive heat sink 36, a fully threaded B+ battery terminal 57, and a hexagon configured spacer/fastener 58 that has full internal threads to enable easy assembly and secure fastening of the spacer/fastener 58 to the B+ stud terminal 57 of the rectifier bridge assembly 31.

FIGS. 2 A through 2 F show Top View sketches of the Improved Automotive Rectifier Bridge Assembly device 31 in a progressive sequence of connecting the replacement rectifier bridge 31 to a new type of voltage regulators 32. FIGS. 3 A through 3 C are Side View sketches of components of the Improved Automotive Rectifier Bridge Assembly device 31 in a progressive sequence of connecting to a voltage regulators 32. These views have the same components described in the various figures described above in the description of the preferred embodiment. The characteristics of the components are incorporated by reference. In FIG. 3 B, one is well to note the very secure yet removable connection afforded by the threaded stud 57 and internally threaded spacer/fastener 58. This combination traps and sandwiched the Open "C" B+ ring terminal 34 between the fastener 58 and the positive heat sink 36. As one skilled in remanufacturing appreciates, speed to disassemble and reassemble components for products such as an alternator is key to being able to have a profit. Also key is to assure the rebuilt product is of high quality and durability. The Improved Automotive Rectifier Bridge Assembly device 31 provides a fast method for assembly and disassembly. The design of sandwiching the B+ terminal 34 between the fastener 58 and the heat sink 36 improves the electrical connection. The threaded stud 57 and fastener 58 permits a secure connection through tightening the threads with a wrench or pneumatic driver and being able to easily check torque readings to assure a proper and secure connection. Likewise, the larger top hat method 38, 38A permits the stud 57 to be securely connected to the heat sink 36 and to resist any torque loosening through the stud 57.

FIG. 5 is the detailed electrical schematic 41 for the Improved Automotive Rectifier Bridge Assembly device 31 and a Voltage Regulator 32, 59. In this diagram, the Improved Automotive Rectifier Bridge Assembly device 31 is shown in the detailed electrical schematics for the alternator and electrical charging system. For one skilled in the art of automotive alternator systems, this is self explanatory. Significant to the system are the electrical loads, connection to the engine computer module (ECM) and connection to the starter and battery. The latter is normally connected through a key switch commonly call the ignition switch where a person operates the switch with a key. The alternator also has a series of connections from the regulator 32 to the field coil through the F+ terminal. The regulator 32 is connected to the rectifier bridge 31 through the VGO or B Plus 34 connection described above. The rectifier bridge 31 is likewise connected to the stator by lead terminals 56, shown in some of the drawings. A sense terminal and P terminal (Phase wave) 35 also provides control information. One skilled in the art appreciates the importance of all the various ground paths 37 shown from the various components of the electrical system.

FIGS. 7 A and 7 B are that show the standard OE rectifier bridge 44 assembled to the original OE 59 and new improved replacement voltage regulators 32. The older style OE rectifier bridge 44 is shown for reference and indicates that the newer replacement regulator 32 is compatible for use in rebuild with either the new 32 or OE style 59 regulators. The old style spacer 58A and the stud 57A may be fitted to either regulator—OE 59 or improved replacement regulator 32

FIGS. 8 A and 8 B are sketches that show the new and improved rectifier bridge 31 assembled to the original OE 59 and new improved replacement voltage regulators 32. Again, this demonstrates that in the remanufacturing process, the OE regulator 59 uses the phase terminal 35 and the B+ terminal 34A. The newer improved regulator 32 may each be utilized with the Improved Automotive Rectifier Bridge Assembly device 31 and is connected only to the phase terminal 35. One skilled in the art of automotive electronics appreciates the B+ connection is made through the ground "C" ring 34 rather than by the terminal 34A. In the case of the Improved Automotive Rectifier Bridge Assembly device 31, the features of the fully threaded stud 57, the internally threaded spacer/fastener 58, the top hat anti-turn connection method 38, and all the other improvements of the Improved Automotive Rectifier Bridge Assembly device 31 are realized.

With this description it is to be understood that the Improved Automotive Rectifier Bridge Assembly device 31 is not to be limited to only the disclosed embodiment. The features of the Improved Automotive Rectifier Bridge Assembly device 31 are intended to cover various modifications and equivalent arrangements included within the spirit and scope of the description.

What is claimed is:

1. An improved automotive rectifier bridge device in an alternator, the alternator having at least an end casting, a stator, and an electronic regulator among its typical other alternator components and the alternator being a part of an electrical charging system of a vehicle, and the rectifier bridge device comprising:
   a). a plurality of negative and positive diodes;
   b). a means to electrically interconnect the diodes between each other;
   c). at least one positive heat sink and at least one negative heat sink;
   d). a means to mechanically connect the diodes to the heat sinks forming a negative and a positive heat sink assemblies;

e) a means to secure the heat sink assemblies to the slip ring end casting of the alternator;
f). a means to electrically connect the diodes to the alternator stator;
g) a B+ connector;
h). an aperture in the heat sink wherein the aperture is contiguous to the threaded B+ connector to the positive heat sink of the rectifier device to enable the connection to have increased torque;
i). a means to connect the B+ connector to the electrical system of the vehicle;
j). means to connect the rectifier device to a B+ connector; and
k). a means to removably connect the electrical interconnection for the diodes and heat sink to the regulator wherein the rectifier device provides a conversion of an alternating current to a direct current and a method to provide the direct current to the electrical charging system.

2. The apparatus according to claim 1 wherein the means to connect the externally threaded B+ connector to the electrical system of the vehicle is an elongated internally threaded hexagon fastener that securely connects the regulator to the B+ connector and the electrical system.

3. An improved automotive rectifier bridge device in an alternator, the alternator having at least an end casting, a stator, and an electronic regulator among its typical other alternator components and the alternator being a part of an electrical charging system of a vehicle, and the rectifier bridge device comprising:

a). three negative and three positive diodes;
b). a plastic connector with insert molded copper straps that electrically interconnect the diodes between each other;
c). one positive heat sink and one negative heat sink;
d). a means to mechanically connect the diodes to the heat sinks forming a negative and a positive heat sink assemblies;
e) four externally threaded fasteners that secure the heat sink assemblies to the slip ring end casting of the alternator;
f). a means to electrically connect the diodes to the alternator stator;
g) an externally threaded B+ stud;
h). a means to connect the B+ stud to the positive heat sink of the rectifier device;
i). an internally threaded hexagon fastener to connect the B+ connector to the electrical system of the vehicle;
j). means to connect the rectifier device to a B+ connector; and
k). a slotted connection on the rectifier and an open "C" on the regulator to removably connect the electrical interconnection for the diodes and heat sink to the regulator wherein the rectifier device provides a conversion of an alternating current to a direct current and a method to provide the direct current to the electrical charging system.

\* \* \* \* \*